(12) United States Patent
Ginja et al.

(10) Patent No.: US 7,681,700 B2
(45) Date of Patent: Mar. 23, 2010

(54) ENERGY ABSORBER SYSTEM FOR A MOTOR VEHICLE

(75) Inventors: Stephane Ginja, Amberieu en Bugey (FR); Laurent Rocheblave, Villeurbanne (FR)

(73) Assignee: Compagnie Plastic Omnium, Lyons (FR)

( * ) Notice: Subject to any disclaimer, the term of this patent is extended or adjusted under 35 U.S.C. 154(b) by 431 days.

(21) Appl. No.: 11/644,008

(22) Filed: Dec. 22, 2006

(65) Prior Publication Data

US 2007/0144851 A1 Jun. 28, 2007

(30) Foreign Application Priority Data

Dec. 23, 2005 (FR) .................................. 05 13290

(51) Int. Cl.
F16F 7/12 (2006.01)
(52) U.S. Cl. ................ 188/377; 188/371; 267/139; 293/120; 293/132; 296/187.03; 296/187.09
(58) Field of Classification Search ................ 188/377, 188/371, 376; 293/132, 133, 120, 122; 267/139, 267/140, 153; 296/187.03, 187.09, 187.11
See application file for complete search history.

(56) References Cited

U.S. PATENT DOCUMENTS

| | | | | |
|---|---|---|---|---|
| 4,186,915 A | * | 2/1980 | Zeller et al. ................ 267/140 |
| 5,219,197 A | * | 6/1993 | Rich et al. ................ 293/120 |
| 5,425,561 A | * | 6/1995 | Morgan ................ 293/120 |
| 5,988,713 A | * | 11/1999 | Okamura et al. ............ 293/120 |
| 6,467,822 B1 | | 10/2002 | Leng | |
| 6,663,150 B1 | * | 12/2003 | Evans ................ 293/120 |
| 6,669,251 B2 | * | 12/2003 | Trappe ................ 293/120 |
| 6,709,036 B1 | * | 3/2004 | Evans ................ 293/120 |
| 6,729,682 B2 | * | 5/2004 | Delavalle et al. ........ 296/193.08 |
| 6,938,936 B2 | * | 9/2005 | Mooijman et al. .......... 293/120 |
| 7,152,916 B2 | * | 12/2006 | Roussel ................ 296/203.02 |

FOREIGN PATENT DOCUMENTS

| | | |
|---|---|---|
| EP | 1 300 293 A1 | 4/2003 |
| FR | 2 829 733 | 3/2003 |
| FR | 2 840 573 | 12/2003 |

* cited by examiner

Primary Examiner—Robert A Siconolfi
Assistant Examiner—Mariano Sy
(74) Attorney, Agent, or Firm—Oliff & Berridge, PLC

(57) ABSTRACT

The energy absorber system is adapted to a motor vehicle having side rails. The system comprises a top absorber beam positioning in front of the side rails of the motor vehicle, a bottom absorber beam for being positioned beneath the top absorber beam, and at least two uprights providing a rigid connection between the top and bottom beams. The system also includes a rigid cross-member extending between the side rails and being secured directly to the side rails, the top beam being secured to bear against the cross-member.

11 Claims, 1 Drawing Sheet

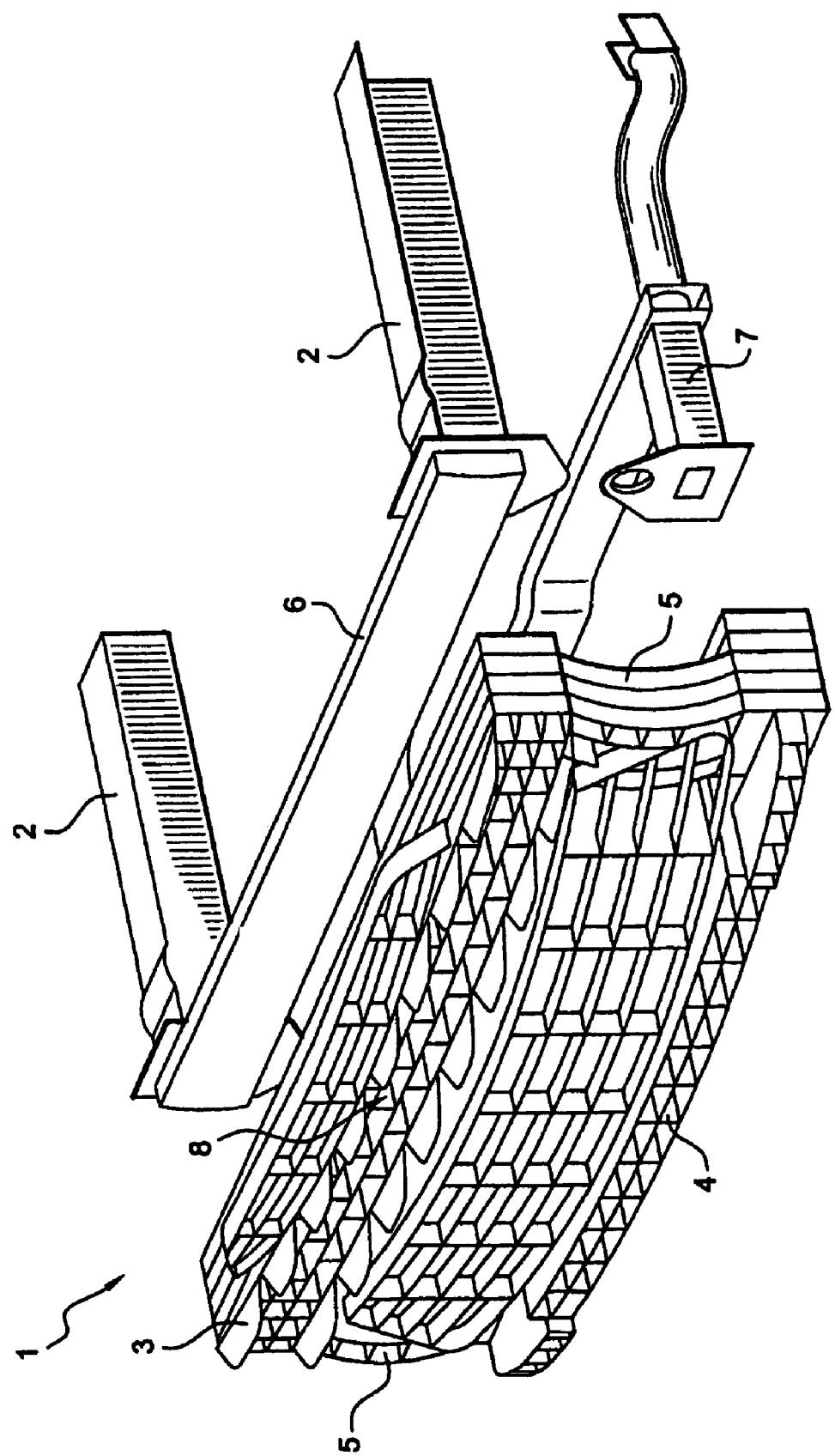

ENERGY ABSORBER SYSTEM FOR A MOTOR VEHICLE

TECHNICAL FIELD

The invention relates to absorbing energy during an impact involving a motor vehicle. The energy absorber system must be capable of absorbing the energy of an impact effectively so as to protect the occupants of the motor vehicle, and it must do so without being excessively bulky.

In the present application, the term "beam" is used to designate a longitudinal structure bearing against at least one, and generally two, fixed points. Such a structure may integrate energy absorber means such as honeycombs, capable of consuming energy in order to deform, thereby reducing the residual quantity of energy that is transmitted to the fixed bearing point. Under such circumstances, the beam is said to be an "absorber" beam.

Furthermore, the term "cross-member" is used to designate a rigid structure extending between two points to which it is secured. It should be observed that a cross-member provides less than 3% of the energy absorption in the event of an impact.

STATE OF THE ART

An energy absorber system for a vehicle provided with side rails is already known in the state of the art, in particular from FR 2 829 733, that system comprising a top absorber beam for being disposed in front of the side rails of the motor vehicle, a bottom absorber beam for being disposed beneath the top absorber beam, and at least two uprights providing a rigid connection between the top and bottom absorber beams. The assembly constituted by the two beams and the two uprights forms an energy absorber frame that is secured to the ends of the side rails with absorbers being interposed between them for working in compression.

PROBLEM POSED BY THAT STATE OF THE ART

In the state of the art, the side rails are interconnected solely by the absorbers and the top energy absorber beam. Unfortunately, the absorbers are generally so-called "crash boxes", each being designed to absorb energy from a shock extending exactly along the axis of the side rail carrying it.

In the event of an impact that is oblique, or a head-on impact against the frame but not exactly on the axis of the side rail, the force delivered to the absorber necessarily includes an oblique component that the absorber cannot handle by bearing against the side rail.

Consequently, energy from the impact runs the risk of being delivered in full to the absorber and the side rail that lies closer to the axis of the impact.

In other words, the side rails are not coupled together effectively, such that in the event of an impact, the force is not shared between both side rails.

Furthermore, in the event of an impact against the top absorber beam in a central zone between the side rails, the beam tends to work in bending rather than in compression, and therefore does not absorb energy in optimum manner.

Thus, in order to compensate for the above defects and absorb the energy due to an impact effectively, the overhang at the front of the vehicle is relatively great.

SOLUTION PROPOSED BY THE INVENTION

The invention proposes reducing the overhang of the vehicle, but without reducing the effectiveness of the energy absorber system.

To this end, the invention provides an energy absorber system for a motor vehicle provided with side rails, the system comprising a top absorber beam for being disposed in front of the side rails of the motor vehicle, a bottom absorber beam for being disposed beneath the top absorber beam, and at least two uprights providing a rigid connection between the top and bottom beams, the system further comprising a rigid cross-member extending between the side rails and being secured directly to the side rails, the top beam being secured to bear against the cross-member.

In the present description, the absorption function is considered as being satisfied in the event of the absorber or the absorber beam absorbing at least 7% of the energy of the impact.

As a result, mere stiffening, e.g. consisting in providing a bearing surface for the bottom portion of a pedestrian's leg, does not provide energy absorption.

By means of the rigid cross-member, the side rails are coupled together effectively and any force applied to the beam is better shared between the side rails. In addition, since the top absorber beam is pressed against the rigid cross-member, it can work in compression alone against the rigid cross-member in the event of an impact, and consequently it can act better to absorb the energy of the impact.

Thus, since energy absorption is provided better by the energy absorber system, it is possible to reduce the overhang.

Furthermore, because the side rails and the cross-member deform little if at all, the members arranged behind the cross-member, such as a radiator, are better protected in the event of an impact than they would be in a conventional system.

ADVANTAGEOUS PARTICULAR EMBODIMENTS

The top and bottom absorber beams are substantially horizontal and the uprights are substantially vertical when the system is mounted on the motor vehicle.

For a motor vehicle having an engine cradle, the bottom absorber beam bears against extenders of the engine cradle.

At least one element selected from the top absorber beam, the bottom absorber beam, and one of the uprights is made of thermoplastic material.

The top absorber beam, the bottom absorber beam, and the uprights form a single piece made integrally.

The absorber system includes at least one member of the front block of a motor vehicle, e.g. a radiator grille, and/or an air deflector for encouraging the flow of air or the exchange of heat, a horn device, or a water tank.

At least one element selected from the top absorber beam, the bottom absorber beam, and one of the uprights includes an array of ribs forming an energy absorber zone.

The energy absorber system is for placing at the front of the motor vehicle.

The invention also provides a front or rear block for a motor vehicle, the block including an absorber system as defined above.

Finally, the invention provides a method of mounting an energy absorber system on a motor vehicle, the method comprising:

- a step of molding a top absorber beam, a bottom absorber beam, and at least two uprights providing a rigid connection between the top and bottom beams as a single piece;
- a step of fastening the top beam to bear against a rigid cross-member; and
- a step of securing the rigid cross-member to side rails of the motor vehicle.

DESCRIPTION OF AN EXAMPLE

An example of the energy absorber system of the invention is illustrated by the sole accompanying FIGURE that presents no limiting character.

The sole FIGURE is an exploded perspective view of an energy absorber system for a motor vehicle constituting an embodiment of the invention. The energy absorber system is given overall reference 1.

The energy absorber system 1 is for fitting to a motor vehicle that has side rails 2, preferably made of metal, and provided with low structural extensions 7, e.g. engine cradle extensions. The absorber system 1 is preferably arranged at the front of the motor vehicle, constituting a portion of the front block of the motor vehicle.

Preferably, the energy absorber system 1 includes at least one front block member of the motor vehicle capable of being replaced easily if it is destroyed in an impact. For example, the absorber system includes a radiator grille and/or an air deflector for encouraging the flow of air or for exchanging heat, a horn device, or a water tank.

The absorber system 1 includes a rigid cross-member 6, secured to the side rails 2, thus forming a rigid connection between the side rails 2. The cross-member 6 is preferably made of steel, of aluminum, or of composite material.

The absorber system 1 also has a first beam 3 referred to as a top absorber beam. The top beam 3 is substantially horizontal and is preferably made of thermoplastic material or of metal and plastics hybrid material. It is provided with an array of ribs 8 forming an energy absorber zone. It is should be observed that the array of ribs can be densified in order to encourage energy absorption.

The top beam 3 is secured to bear against the rigid cross-member 6 so as to work in compression alone during an impact.

The absorber system 1 also includes a second beam 4, referred to as the bottom absorber beam. The bottom beam 4 is substantially horizontal and is preferably made of thermoplastic material or of metal and plastics material hybrid. It is likewise provided with an array of ribs forming an energy absorber zone.

The bottom beam 4 is secured to bear against the engine cradle extensions 7.

Substantially vertical uprights 5 provide a rigid connection between the top and bottom beams 3 and 4.

These uprights 5 are preferably made of thermoplastic material.

They are provided with respective arrays of ribs forming energy absorption zones.

The top and bottom absorber beams 3 and 4 and the uprights 5 preferably together form a one-piece frame made integrally.

General Explanations

In the event of an impact, the frame constituted by the top and bottom absorber beams 3 and 4 and the uprights 5 serve to provide a larger impact area, such that two vehicles colliding necessarily meet level with the absorber system. Thus, because of this frame, the rigid structures of each of the vehicles no longer constitute intrusive parts that are destructive for the other vehicle.

Furthermore, the frame provides a larger absorption area, such that the force due to an impact is better distributed, thereby facilitating absorption and reducing aggressivity.

In other words, the frame improves compatibility between vehicles of different types and brands and reduces the intrusive nature, and thus the aggressivity, of an impact.

In the event of an impact against the frame, force is transited in particular to the cross-member. Since the cross-member is rigid, the force is distributed between the side rails. This improves structural interactions between vehicles and limits risks of non-structural portions of the vehicles being deformed.

It should be observed that the energy absorber system 1 is preferably mounted on a motor vehicle during an assembly method such that:

- a top absorber beam 3, a bottom absorber beam 4, and at least two uprights 5 providing a rigid connection between the top and bottom beams 3 and 4 are molded as a single piece;
- the top beam 3 is secured to bear against the rigid cross-member 6; and
- the rigid cross-member 6 is secured to the side rails 2 of the motor vehicle.

Generalizations or Alternatives that are Envisaged

An energy absorber system of the invention can be adapted to be disposed at the rear end of a motor vehicle, in which case it forms part of the rear block of the motor vehicle. Under such circumstances, the low structure is constituted, for example, by a motor vehicle floor.

What is claimed is:

1. An energy absorber system for a motor vehicle provided with side rails and a low structure, the system comprising:
    a top absorber beam for being disposed in front of the side rails of the motor vehicle, extending substantially horizontally when the system is mounted on the motor vehicle;
    a bottom absorber beam for being disposed beneath the top absorber beam, extending substantially horizontally, and being secured to bear against extensions of the low structure, when the system is mounted on the motor vehicle;
    at least two uprights providing a rigid connection between the top and bottom beams, extending substantially vertically between an end of a top absorber beam and an end of a bottom absorber beam, when the system is mounted on the motor vehicle; and
    a rigid cross-member extending between the side rails and being secured directly to the side rails, the top beam being secured to bear against the cross-member, the rigid cross-member extending along an entire length of the top absorber beam.

2. The energy absorber system according to claim 1, further comprising at least one member of a front block of a motor vehicle.

3. The energy absorber system according to claim 1, wherein at least one element selected from the top absorber beam, the bottom absorber beam, and one of the uprights is made of thermoplastic material.

4. The energy absorber system according to claim 1, wherein the top absorber beam, the bottom absorber beam, and the uprights form a single piece made integrally.

5. The energy absorber system according to claim 1, wherein at least one element selected from the top absorber beam, the bottom absorber beam, and one of the uprights includes an array of ribs forming an energy absorber zone.

6. The energy absorber system according to claim 1, for being fitted to the front of a motor vehicle.

7. A front or rear block of a motor vehicle, the block including an absorber system according to claim 1.

8. A method of mounting an energy absorber system on a motor vehicle, the method comprising:
- a step of molding a top absorber beam, a bottom absorber beam, and at least two uprights providing a rigid connection between the top and bottom beams as a single piece, so that the top and bottom absorber beams extend substantially horizontally and the two uprights extend substantially vertically between an end of a top end of the top absorber beam and an end of the bottom absorber beam, when the system is mounted on the motor vehicle;
- a step of fastening the top beam to bear against a rigid cross-member extending along an entire length of the top absorber beam; and
- a step of securing the rigid cross-member to side rails of the motor vehicle so that the bottom absorber beam is secured to bear against extensions of a low structure of the vehicle.

9. The energy absorber system according to claim 2, wherein the at least one member is selected from a radiator grille, an air deflector for encouraging a flow of air or an exchange of heat, a horn device and a water tank.

10. The energy absorber system according to claim 1, wherein the low structure of the motor vehicle is constituted by an engine cradle.

11. The energy absorber system according to claim 1, wherein the low structure of the motor vehicle is constituted by a motor vehicle floor.

* * * * *